(12) United States Patent
Lei et al.

(10) Patent No.: US 12,612,193 B2
(45) Date of Patent: Apr. 28, 2026

(54) UNMANNED AERIAL VEHICLE

(71) Applicant: AUTEL ROBOTICS CO., LTD., Shenzhen (CN)

(72) Inventors: Lei Lei, Shenzhen (CN); Ao He, Shenzhen (CN); Kangli Wang, Shenzhen (CN); Zhuanpeng Cheng, Shenzhen (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 0 days.

(21) Appl. No.: 19/097,577

(22) Filed: Apr. 1, 2025

(65) Prior Publication Data

US 2025/0304293 A1      Oct. 2, 2025

(30) Foreign Application Priority Data

Apr. 1, 2024    (CN) .......................... 202420670983.9

(51) Int. Cl.
| | |
|---|---|
| *B64U 20/70* | (2023.01) |
| *B64U 10/10* | (2023.01) |
| *B64U 50/39* | (2023.01) |

(52) U.S. Cl.
CPC ............. *B64U 20/70* (2023.01); *B64U 10/10* (2023.01); *B64U 50/39* (2023.01)

(58) Field of Classification Search
CPC ......... B64U 20/70; B64U 10/10; B64U 50/39
See application file for complete search history.

(56) References Cited

U.S. PATENT DOCUMENTS

| | | | | |
|---|---|---|---|---|
| 2,309,875 A | * | 2/1943 | Thompson ............ | B60F 3/0007 |
| | | | | 180/6.48 |
| 5,779,190 A | * | 7/1998 | Rambo .................. | B64U 50/13 |
| | | | | 244/54 |
| 10,468,812 B1 | * | 11/2019 | Lee ........................ | H01R 13/24 |
| 11,230,374 B2 | * | 1/2022 | Belik ................... | B64C 35/008 |
| 11,482,806 B1 | * | 10/2022 | Lin ..................... | H01M 50/502 |

* cited by examiner

*Primary Examiner* — Justin M Benedik
(74) *Attorney, Agent, or Firm* — Arch & Lake LLP

(57) ABSTRACT

An unmanned aerial vehicle (UAV) is disclosed by some embodiments of the present application. The UAV may include a fuselage, a wing, and a power device mounted on the fuselage to provide lift. The fuselage includes a battery compartment with an upward-facing opening and a battery interface positioned near the opening. The battery compartment has an open, upward structure, allowing the battery to be directly installed or removed without detaching a cover plate.

12 Claims, 5 Drawing Sheets

UNMANNED AERIAL VEHICLE

CROSS-REFERENCE

The present application is based upon and claims priority to Chinese Patent Application No. 2024206709839, filed on Apr. 1, 2024, the entire contents of which are incorporated herein by reference for all purposes.

TECHNICAL FIELD

Embodiments of the present application relate to the technical field of aircrafts, and in particular, to an unmanned aerial vehicle (UAV).

BACKGROUND

An unmanned aerial vehicle, abbreviated as "UAV" in English, is an unmanned aircraft controlled by a radio remote control device and a self-contained program control device, or operated completely or intermittently autonomously by an on-board computer. The UAV plays an important role in various fields of production and life. In the prior art, most UAVs adopt a battery as a power source, and the UAV can fly by converting electrical energy into mechanical energy to generate lift.

During implementation of the embodiments of the present application, the inventor found that most existing UAVs have enclosed battery compartments. During mounting and removal of a battery, a cover plate of the battery compartment needs to be opened first, which is cumbersome and inefficient.

SUMMARY

According to an aspect of the present application, there is provided an unmanned aerial vehicle (UAV). The UAV includes a fuselage. The fuselage includes a battery compartment. The battery compartment has a compartment opening, and a compartment bottom positioned opposite to the compartment opening. The compartment opening is oriented upward, enabling direct access to the battery compartment from the exterior. A battery interface is located in an upper portion of the battery compartment, and positioned between the compartment opening and the compartment bottom.

BRIEF DESCRIPTION OF THE DRAWINGS

To describe the technical solutions in specific embodiments of the present application more clearly, the following briefly describes the accompanying drawings that need to be used in the description of the specific embodiments. In all of the accompanying drawings, similar elements or parts are generally marked by similar reference numerals. In the accompanying drawings, each element or part is not necessarily drawn to actual scale.

DETAILED DESCRIPTION

For ease of understanding, the present application is described in more detail below with reference to the accompanying drawings and specific embodiments. It should be noted that when an element is expressed as "being fixed to" another element, the element may be directly mounted to another element, or one or more intermediate elements may exist between them. When an element is expressed as "being connected to" another element, it may be directly connected, or one or more intermediate elements may exist between them.

Orientation or position relationships indicated by terms such as "up," "down," "inside," "outside," "perpendicular," and "horizontal" are based on the relationships shown in the accompanying drawings and are used for descriptive purposes rather than to impose specific constructional limitations. Furthermore, terms "first" and "second" are used for differentiation and do not imply priority or importance.

Unless otherwise defined, meanings of all technical and scientific terms used in this specification align with their conventional understanding in the relevant technical field. The terms in this specification describe specific embodiments but do not limit the present application. The term "and/or" encompasses any or all combinations of one or more listed elements.

Additionally, the technical features in different embodiments of the present application may be combined as long as they are not in conflict.

A technical problem resolved by embodiments of the present application is to provide an unmanned aerial vehicle (UAV) with an improved battery compartment design, allowing a battery device to be directly installed or removed without requiring the prior removal of a cover plate. This enhances operational efficiency and simplifies battery replacement.

Figures 1, 2:
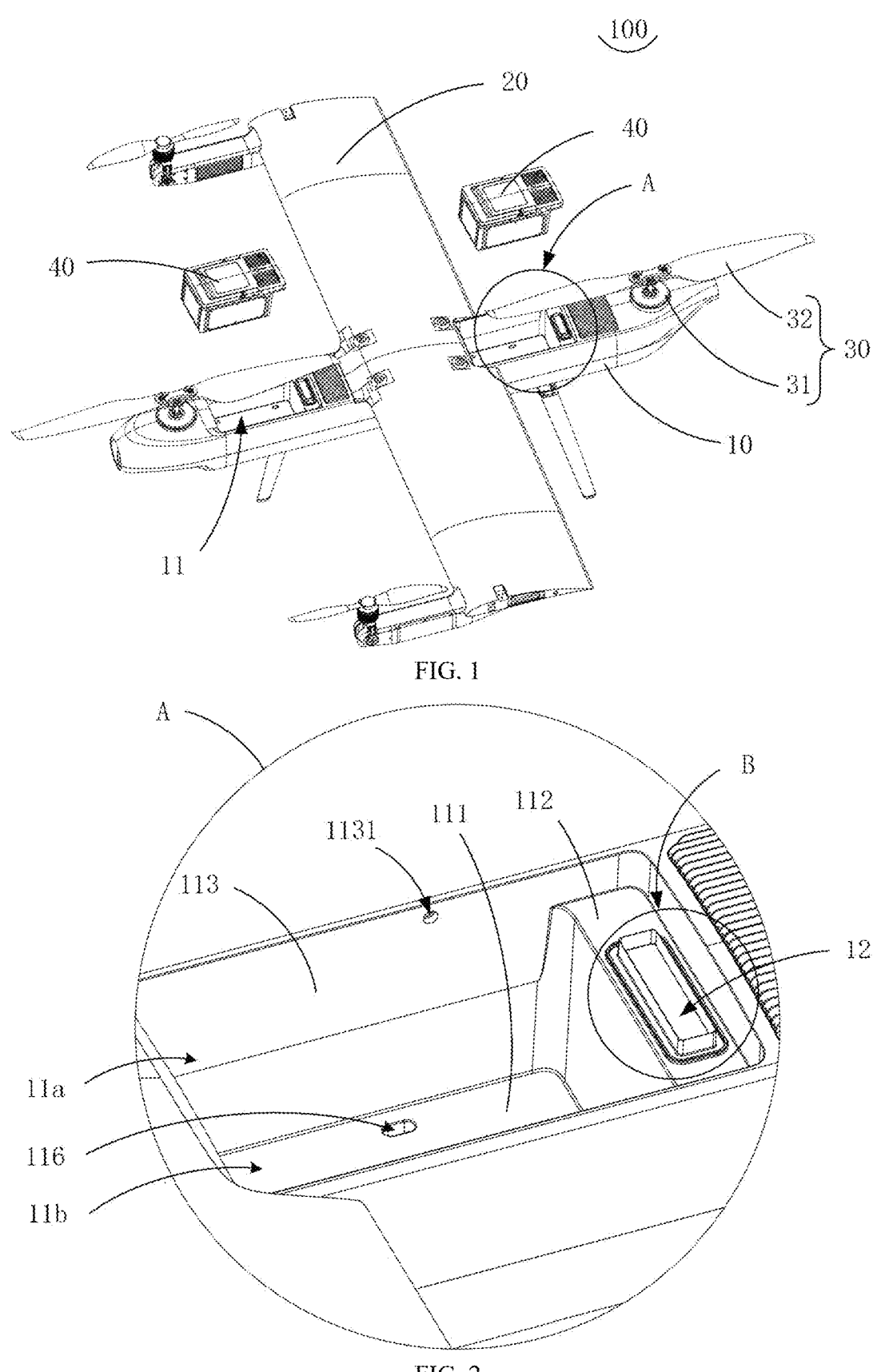
FIG. 1 is an exploded view of an unmanned aerial vehicle (UAV) according to an embodiment of the present application from a perspective.
FIG. 2 is an enlarged view of a portion A of the UAV in FIG. 1 according to an embodiment of the present application.

Referring to FIGS. 1 and 2, the present application provides an unmanned aerial vehicle (UAV) 100, comprising: a fuselage 10; a wing 20 mounted to the fuselage 10; a power device 30 positioned on the fuselage 10 to provide lift; and a battery device 40.

The fuselage 10 defines a battery compartment 11 having a compartment opening 11*a* and a compartment bottom 11*b* positioned opposite each other. The compartment opening 11*a* is oriented upward, allowing direct placement and removal of the battery device 40 from above. The battery interface 12 is located on an upper portion of the battery compartment 11, positioned between the compartment opening 11*a* and the compartment bottom 11*b*, and is closer to the compartment opening 11*a*.

The battery device 40 is arranged in the battery compartment 11 and is configured to supply power to the power device 30 and other electrical elements inside the fuselage 10. The upward-facing structure of the battery compartment 11 eliminates the need for a cover plate, improving operational efficiency in battery installation and removal. Once mounted, a portion of the battery device 40 may cover the compartment opening 11a, preventing debris or moisture from entering the compartment and ensuring its cleanliness.

Figures 3, 4:
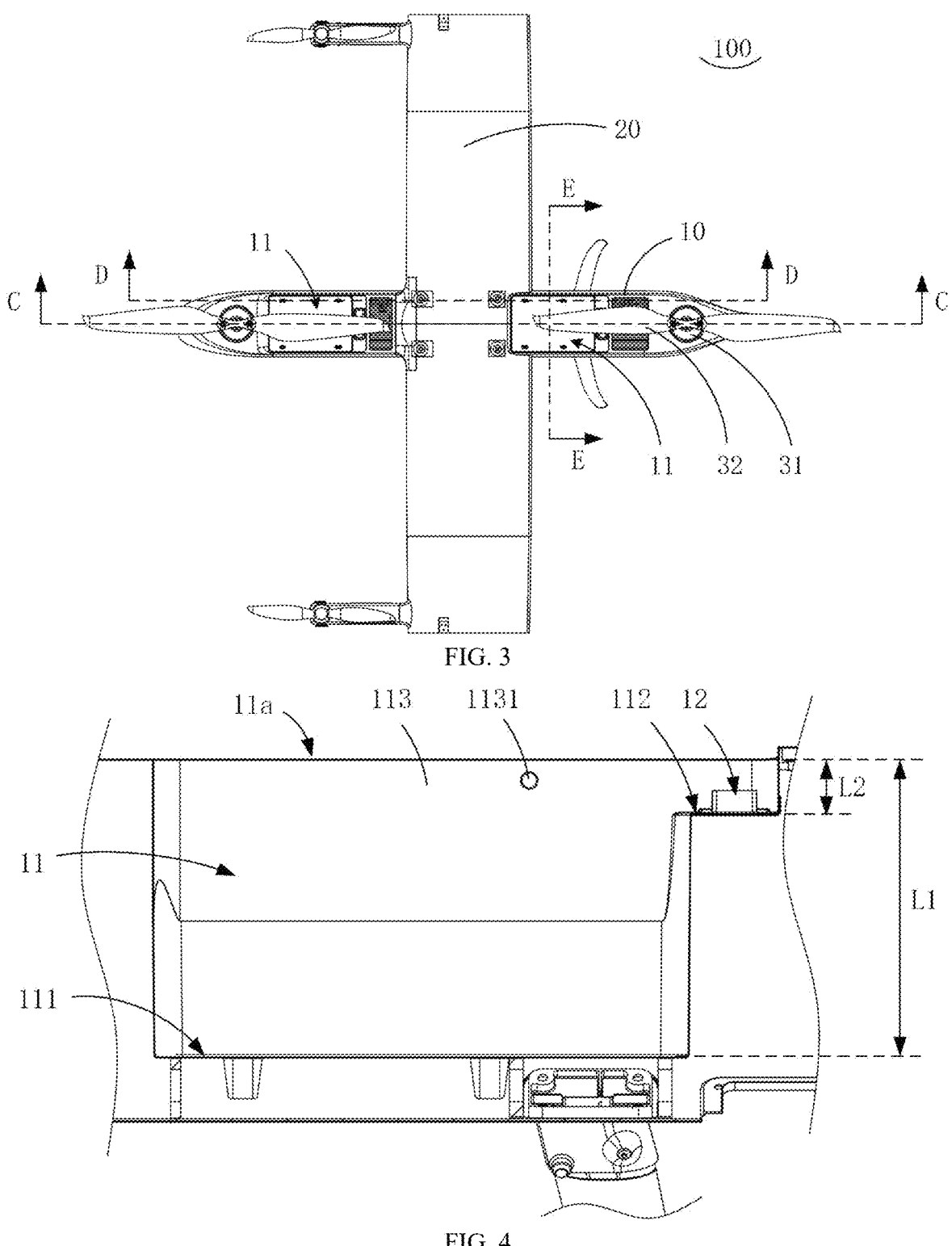
FIG. 3 is a schematic diagram of a UAV according to an embodiment of the present application with a battery device being omitted from another perspective.
FIG. 4 is a cross-sectional view of a UAV according to an embodiment of the present application taken along line C-C in FIG. 3.

In some embodiments, referring to FIGS. 2 and 4, the battery compartment 11 includes: a first bottom wall 111; a second bottom wall 112; and a side wall 113.

The first bottom wall 111 forms the compartment bottom 11b, while the second bottom wall 112 is positioned closer to the compartment opening 11a. The battery interface 12 is arranged on the second bottom wall 112 and connected to electrical elements inside the fuselage 10. This configuration reduces the likelihood of power failure due to water accumulation, as the battery interface 12 is positioned away from the lowest portion of the compartment.

Figures 5, 6:
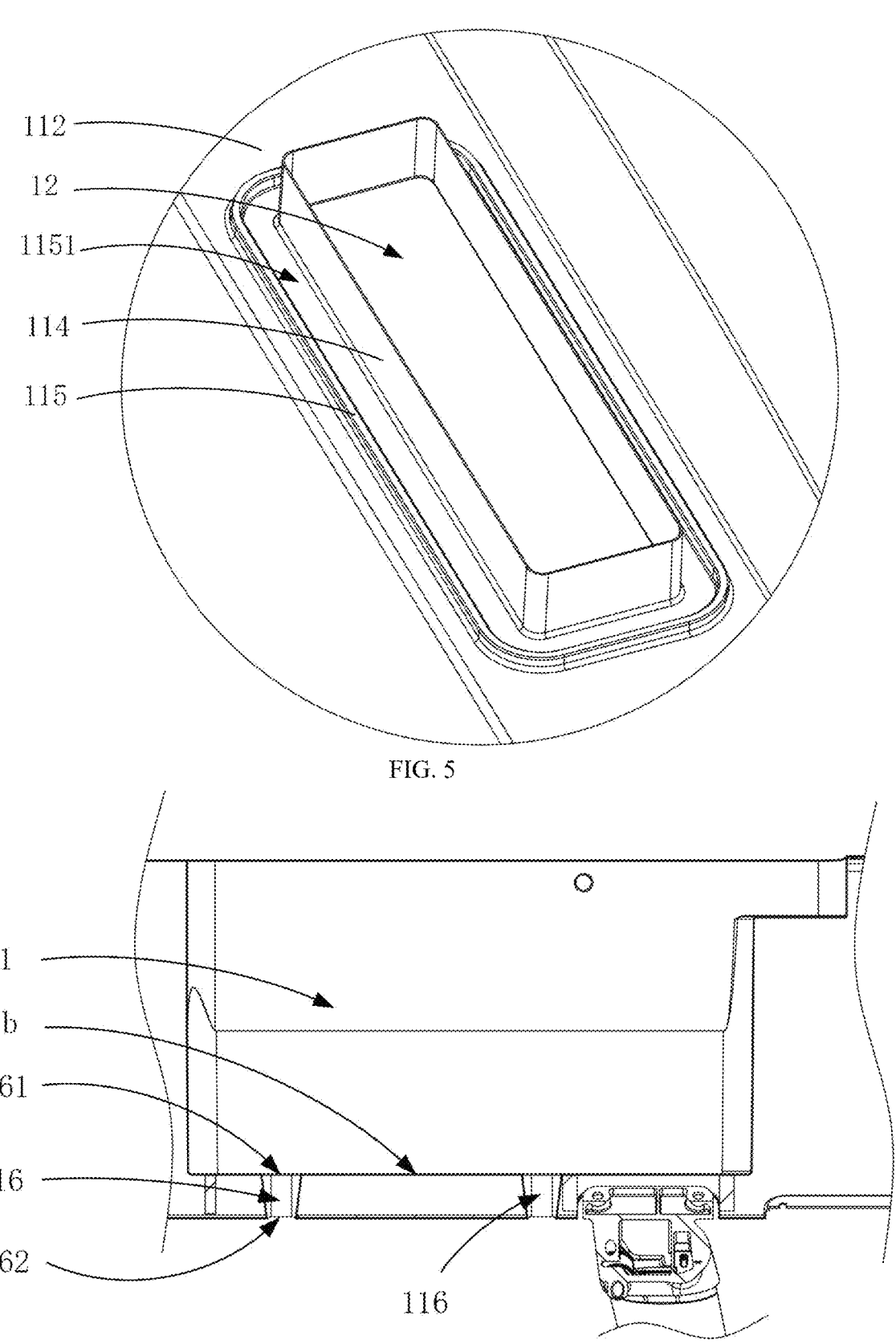
FIG. 5 is an enlarged view of a portion B of the UAV in FIG. 2 according to an embodiment of the present application.
FIG. 6 is a cross-sectional view of a UAV according to an embodiment of the present application taken along line D-D in FIG. 3.

In some embodiments, referring to FIGS. 2 and 5, the UAV 100 further includes a water retaining wall 114 surrounding the battery interface 12. This structure prevents water from entering the fuselage through the battery interface, ensuring the safety of internal electrical components. An annular protrusion 115, spaced apart from the water retaining wall 114, forms an annular groove 1151. This groove accommodates a portion of the battery device 40, forming multiple waterproof barriers for enhanced sealing performance.

The annular protrusion 115 may be of a rigid or flexible structure, designed to abut a sealing element on the battery device 40 to improve waterproofing.

Referring to FIG. 6, the compartment bottom 11b is provided with a drainage channel 116, allowing accumulated water to exit the battery compartment 11. The drainage channel 116 comprises: an inner drainage port 1161, communicating with the compartment interior; and an outer drainage port 1162, communicating with the external environment.

The outer drainage port 1162 has a smaller size than the inner drainage port 1161, generating pressure differences during UAV flight to facilitate water expulsion. This design enhances drainage efficiency, minimizing the time the battery device 40 remains in contact with accumulated water.

Figure 7:
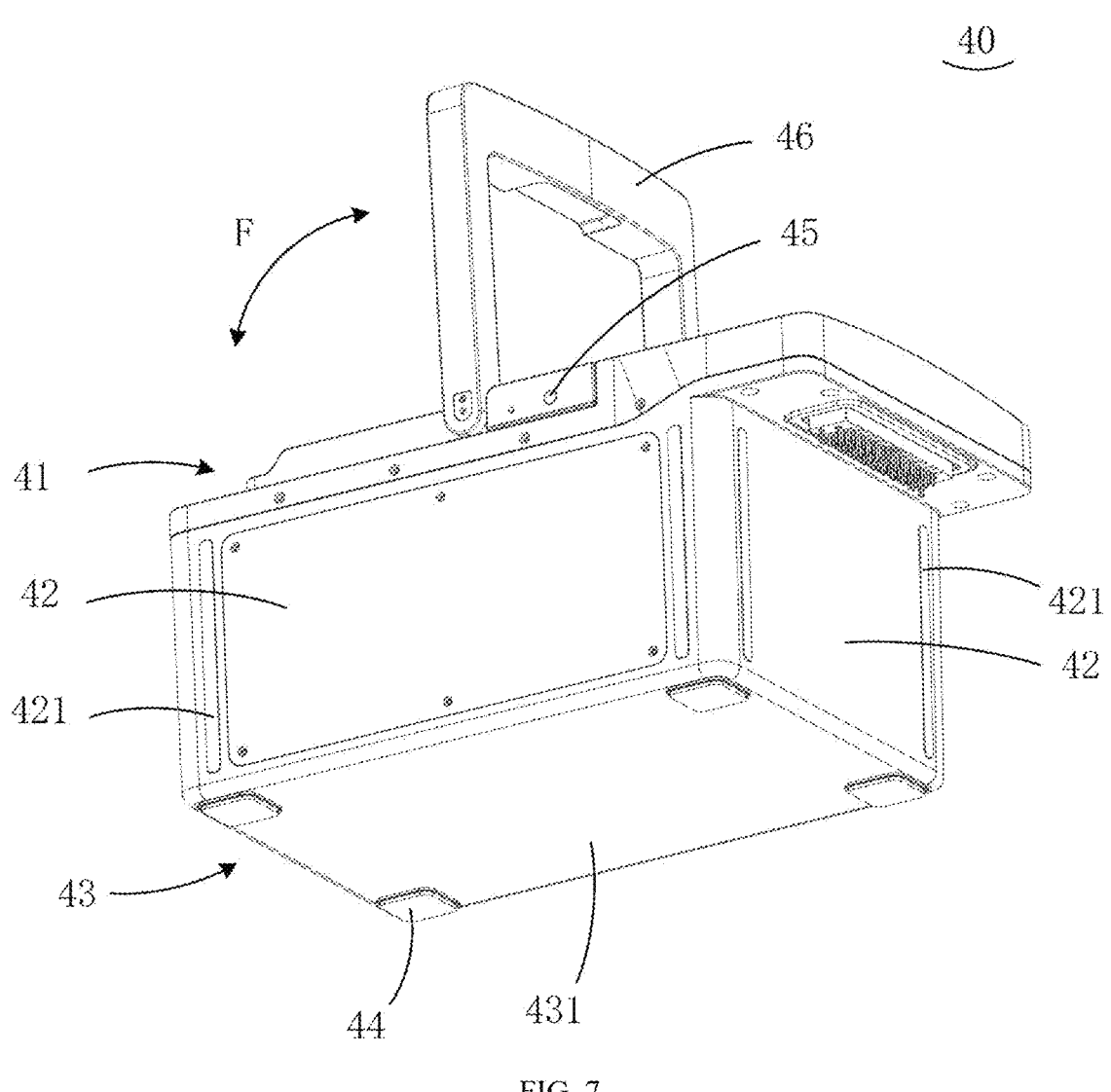
FIG. 7 is a schematic diagram of a battery device of a UAV according to an embodiment of the present application from a perspective.

Referring to FIGS. 4 and 7, the battery device 40 includes: a top portion 41; a bottom portion 43; and a side portion 42.

When mounted, the bottom portion 43 is adjacent to the compartment bottom 11b, and the top portion 41 covers the compartment opening 11a, aligning with the battery interface 12.

In some embodiments, the side portion 42 features a convex rib 421, maintaining spacing between the battery device 40 and the side wall 113. This gap promotes heat dissipation and facilitates drainage by directing water toward the drainage channel 116.

The bottom portion 43 includes a third bottom wall 431, spaced from the inner drainage port 1161, allowing water to flow into the drainage channel 116.

Referring to FIG. 7, the battery compartment 11 further includes a locking portion 1131 on the side wall 113. The battery device 40 has a corresponding locking structure 45, which engages with the locking portion 1131 to secure the battery device 40, preventing displacement or detachment during UAV maneuvers. As an example, the locking portion

1131 may be a locking hole, while the locking structure 45 may be a telescopic locking post controlled via a rotatable handle 46.

Referring to FIG. 1, the power device 30 comprises: a power assembly 31; and a propeller 32.

The power assembly 31 is mounted on the fuselage 10, with the propeller 32 positioned above. The power assembly 31 is electrically connected to the battery device 40 and drives the propeller 32 to generate lift.

As shown in FIG. 3, a portion of the battery compartment 11 is within the projection range of the propeller 32. This configuration utilizes the propeller's airflow for passive cooling of the battery device 40, preventing overheating and improving performance. Additionally, positioning the battery device 40 near the power assembly 31 reduces wire length, lowering overall UAV weight.

Figure 8:
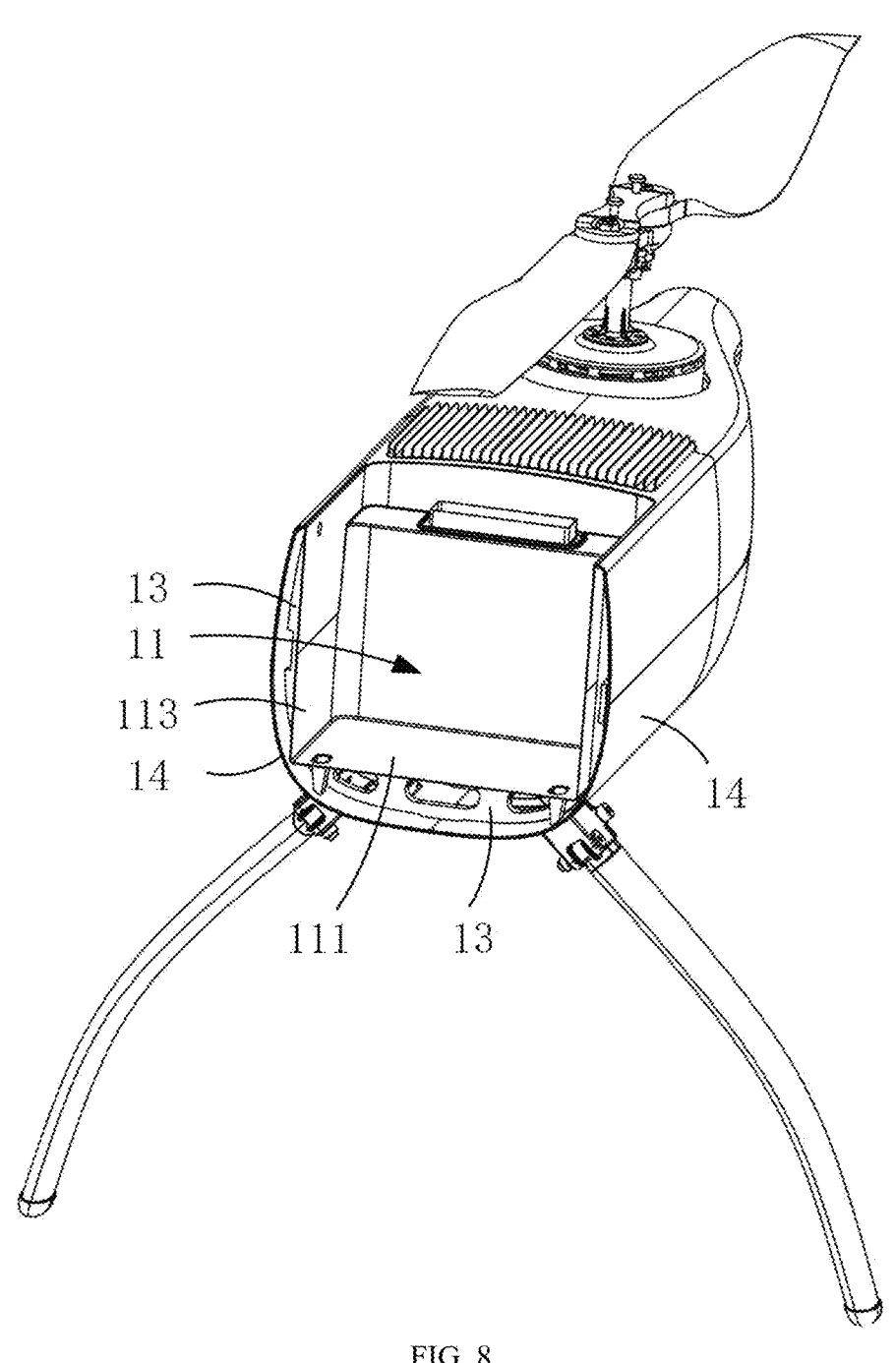
FIG. 8 is a cross-sectional view of a UAV according to an embodiment of the present application taken along line E-E in FIG. 3.

Referring to FIG. 8, the fuselage 10 further includes: a connecting frame 13; and a skin 14.

The connecting frame 13 links the battery compartment 11 and the skin 14, enhancing structural strength.

The present application discloses a UAV 100 with an improved battery compartment structure, allowing direct battery insertion and removal without a cover plate. The drainage system, locking mechanisms, and heat dissipation features enhance UAV reliability and operational efficiency. Specifically, the disclosed UAV 100 design ensures that the battery compartment remains open and easily accessible, allowing for quick battery replacement without removing a cover plate. Additionally, when the battery is installed, a portion of its surface partially covers the compartment opening, reducing the ingress of external liquids into the battery compartment. Furthermore, by positioning the battery interface on an upper portion of the battery compartment, the risk of water accumulation leading to power supply failures is significantly reduced, thereby improving the reliability of the UAV 100's operation and ensuring stable flight performance.

In some embodiments, the battery compartment includes a first bottom wall and a second bottom wall. The first bottom wall forms the compartment bottom, and the second bottom wall is positioned closer to the compartment opening. The battery interface is arranged on the second bottom wall.

In some embodiments, a water retaining wall is positioned on the second bottom wall surrounding the battery interface to help mitigate water ingress.

In some embodiments, an annular protrusion is arranged on the second bottom wall and surrounds the periphery of the water retaining wall, forming an annular groove between the annular protrusion and the water retaining wall.

In some embodiments, the compartment bottom includes a drainage channel, configured to provide fluid communication between a lower portion of the battery compartment and the external environment.

In some embodiments, the drainage channel includes an inner drainage port and an outer drainage port, with the outer drainage port being smaller than the inner drainage port to regulate drainage flow.

In some embodiments, the UAV further includes a battery device positioned within the battery compartment. The bottom portion of the battery device includes a third bottom wall, and the inner drainage port is spaced apart from the third bottom wall.

In some embodiments, the battery compartment includes a side wall connected to both the first and second bottom walls. The side wall is provided with a locking portion, and a locking structure on the battery device is configured to engage with the locking portion, securing the battery device in place.

In some embodiments, the UAC further includes a power device, positioned on the fuselage to provide lift.

In some embodiments, the power device includes a power assembly and a propeller. The power assembly is mounted on the fuselage, and the propeller is connected to the power assembly. At least a portion of the UAV is positioned within the projection range of the propeller's rotation area.

In some embodiments, the fuselage includes a connecting frame and a skin. The connecting frame connects the battery compartment to the skin, with the skin forming part of the outer wall surface of the fuselage.

In some embodiments, the UAV further includes a wing mounted to the fuselage.

The foregoing descriptions illustrate embodiments of the present application and do not limit its scope. Any equivalent structural or procedural modifications based on this disclosure fall within the protection scope of the present application.

The invention claimed is:

1. An unmanned aerial vehicle (UAV), comprising:
a fuselage, comprising a battery compartment, wherein the battery compartment comprises a compartment opening and a compartment bottom positioned opposite to the compartment opening, and the compartment opening is oriented upward to communicate with external environment; and
a battery interface, located in an upper portion of the battery compartment, and positioned between the compartment opening and the compartment bottom along a direction extending from the compartment bottom toward the compartment opening, wherein the upper portion is a portion positioned above and spaced upward from the compartment bottom toward the compartment opening.

2. The UAV of claim 1, wherein the battery compartment comprises:
a first bottom wall and a second bottom wall,
wherein the first bottom wall forms the compartment bottom, a first distance between the first bottom wall and the compartment opening is greater than a second distance between the second bottom wall and the compartment opening, and the battery interface is located on the second bottom wall.

3. The UAV of claim 2, further comprising:
a water retaining wall, positioned on the second bottom wall surrounding the battery interface.

4. The UAV of claim 3, further comprising:
an annular protrusion, positioned on the second bottom wall, and surrounding the water retaining wall; and
an annular groove between the annular protrusion and the water retaining wall.

5. The UAV of claim 2, wherein the compartment bottom comprises:
a drainage channel, configured to provide fluid communication between a lower portion of the battery compartment and the external environment.

6. The UAV of claim 5, wherein the drainage channel comprises:
an inner drainage port and an outer drainage port, wherein the outer drainage port has a smaller size than the inner drainage port.

7. The UAV of claim 6, further comprising:
a battery device positioned within the battery compartment; and
a third bottom wall located at a lower portion of the battery device,
wherein the inner drainage port is spaced apart from the third bottom wall.

8. The UAV of claim 7, wherein the battery compartment further comprises a side wall, wherein the side wall connects the first bottom wall and the second bottom wall, and the side wall comprises a locking portion,
the battery device comprises a locking structure positioned on a side portion of the battery device, and
wherein the locking structure engages with the locking portion to secure the battery device within the battery compartment.

9. The UAV of claim 1, further comprising:
a power device, positioned on the fuselage to provide lift.

10. The UAV of claim 9, wherein the power device comprises:
a power assembly and a propeller,
wherein the power assembly is mounted on the fuselage, the propeller is operably connected to the power assembly, and at least a portion of the UAV is located within a projection range of a rotation area of the propeller.

11. The UAV of claim 10, wherein the fuselage further comprises:
a connecting frame and a skin,
wherein the connecting frame is attached to both the battery compartment and the skin, and the skin forms a partial outer wall of the fuselage.

12. The UAV of claim 1, further comprising:
a wing mounted to the fuselage.

* * * * *